US 8,085,159 B2

(12) United States Patent
Sato

(10) Patent No.: US 8,085,159 B2
(45) Date of Patent: Dec. 27, 2011

(54) ELECTRONIC APPARATUS INCLUDING A BATTERY CHAMBER AND METHOD FOR CONTROLLING THE DISPLAY OF BATTERY INFORMATION

(75) Inventor: Yoichi Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/971,155

(22) Filed: Dec. 17, 2010

(65) Prior Publication Data

US 2011/0085069 A1 Apr. 14, 2011

Related U.S. Application Data

(62) Division of application No. 12/184,822, filed on Aug. 1, 2008.

(30) Foreign Application Priority Data

Aug. 8, 2007 (JP) .................................. 2007-207023

(51) Int. Cl.
*G08B 21/00* (2006.01)

(52) U.S. Cl. ............. 340/636.1; 340/636.11; 340/539.1; 340/686.1; 320/106; 320/110; 320/114; 320/115; 713/193

(58) Field of Classification Search ............... 340/636.1, 340/636.11, 539.1, 686.1; 320/106, 110, 320/114, 115; 713/193
See application file for complete search history.

(56) References Cited

U.S. PATENT DOCUMENTS

| 6,157,169 A * | 12/2000 | Lee | 320/132 |
| 6,274,950 B1 * | 8/2001 | Gottlieb et al. | 307/66 |
| 7,133,703 B2 * | 11/2006 | Aoshima et al. | 455/574 |

* cited by examiner

*Primary Examiner* — Tai T Nguyen
(74) *Attorney, Agent, or Firm* — Cowan, Liebowitz & Latman, P.C.

(57) ABSTRACT

An electronic apparatus that enables a remaining battery capacity to be checked without requiring the battery to be loaded into the electronic apparatus. In this electronic apparatus, a battery lid closes a battery chamber that accommodates a battery. An opening/closing detection device detects opening/closing of the battery lid. An acquisition device acquires battery information of the battery when the opening/closing detection device detects that the battery lid opens. A storing device stores the battery information acquired by the acquisition device. A display device displays the battery information that is stored in the storing device, and displays the battery information of a battery that is not accommodated in the battery chamber.

4 Claims, 12 Drawing Sheets

*FIG. 12*
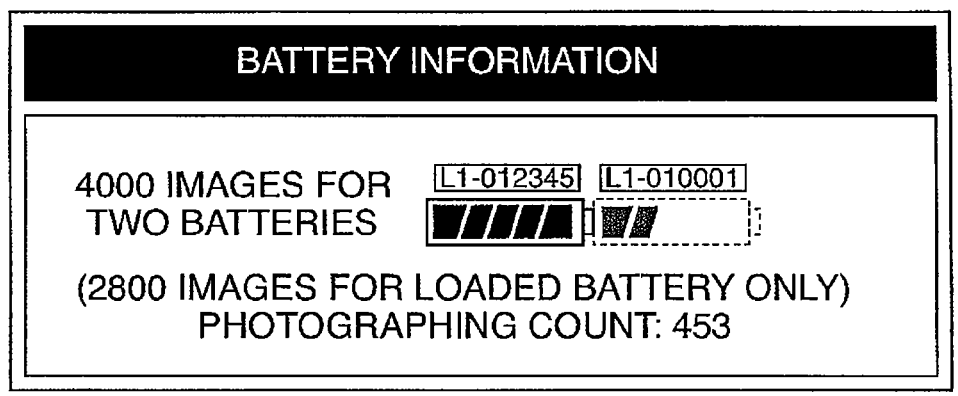
*FIG. 13A*        *FIG. 13B*
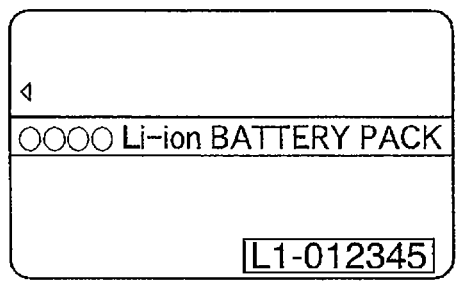 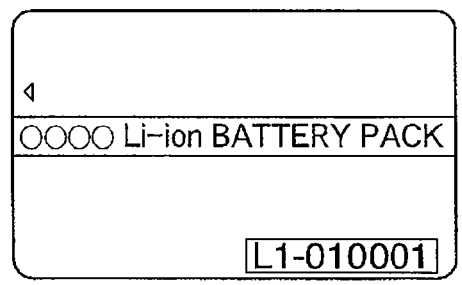

FIG. 14

| BATID | USERNAME | DATE | TIME | FUEL |
|---|---|---|---|---|
| BA20061001005 | NONE | 20061115 | 10:55:01 | 80% |
| BA20061001100 | 000A | 20061101 | 0:55:01 | 50% |
| BA20061001001 | 0000 | 20061021 | 14:21:05 | 10% |

ELECTRONIC APPARATUS INCLUDING A BATTERY CHAMBER AND METHOD FOR CONTROLLING THE DISPLAY OF BATTERY INFORMATION

CROSS-REFERENCE TO RELATED APPLICATION

This application is a divisional of application Ser. No. 12/184,822, filed Aug. 1, 2008, the entire disclosure of which is hereby incorporated by reference.

BACKGROUND OF THE INVENTION

1. Field of the Invention

The present invention relates to an electronic apparatus and a method for controlling the same, and more particularly, to an electronic apparatus which enables a battery capacity to be checked when it is powered by the battery, and a method for controlling the electronic apparatus.

2. Description of the Related Art

Some of the abovementioned type of electronic apparatuses are in the past adapted to display a battery state which is checked according to a voltage or the like on a display unit (for example, an LCD segment display unit, a TFT-LCD character display unit, and an LED display unit) thereof. An example of the TFT-LCD character display unit is shown in FIG. 16. A prior art related thereto is the technique described in Japanese Laid-Open Patent Publication (Kokai) No. 7-176333.

A currently loaded battery cannot solely afford to operate the electronic apparatus continuously for a long time or in the ambient temperature of 0° C. or less. Thus, users generally bring a plurality of batteries as backup batteries. In spite of the circumstances, quite few conventional batteries are adapted to be able to display the capacity thereof on a battery carrier, mainly due to data correctness or cost.

Accordingly, when a user brings a plurality of such batteries, the user bothers to load each of not-yet-loaded ones once into the electronic apparatus to check the battery capacity.

SUMMARY OF THE INVENTION

The present invention provides an electronic apparatus that enables a remaining battery capacity to be checked without requiring the battery to be loaded into the electronic apparatus, and a method for controlling the electronic apparatus.

In a first aspect of the present invention, there is provided an electronic apparatus comprising: a battery lid adapted to close a battery chamber that accommodates a battery; an opening/closing detection device adapted to detect opening/closing of the battery lid; an acquisition device adapted to acquire battery information of the battery when the opening/closing detection device detects that the battery lid opens; a storing device adapted to store the battery information acquired by the acquisition device; and a display device adapted to display the battery information that is stored in the storing device, wherein the display device displays the battery information of a battery that is not accommodated in the battery chamber.

In a second aspect of the present invention, there is provided an electronic apparatus comprising: a battery lid adapted to close a battery chamber that accommodates a battery; an opening/closing detection device adapted to detect opening/closing of the battery lid; a first acquisition device adapted to acquire battery information of the battery when the opening/closing detection device detects that the battery lid opens; a second acquisition device adapted to acquire battery information of the battery when the opening/closing detection device detects that the battery lid closes; a storing device adapted to store the battery information acquired by the first acquisition device and the battery information acquired by the second acquisition device; and a display device adapted to display the battery information stored in the storing device, wherein the display device displays the battery information of a battery that is not accommodated in the battery chamber.

In a third aspect of the present invention, there is provided an electronic apparatus having a battery chamber that accommodates a battery; comprising: an acquisition device adapted to acquire battery information of the battery that is accommodated in the battery chamber; a storing device adapted to store the battery information acquired by the acquisition device; and a display device adapted to display the battery information stored in the storing device, wherein the display device displays the battery information of the battery that is accommodated in the battery chamber and the battery information of a battery that is not accommodated in the battery chamber at the same time.

In a fourth aspect of the present invention, there is provided a method for controlling an electronic apparatus having a battery lid adapted to close a battery chamber that accommodates a battery and an opening/closing detection device adapted to detect opening/closing of the battery lid; comprising: an acquisition step of acquiring battery information of the battery when the opening/closing detection device detects that the battery lid opens; a storing step of storing the battery information that is acquired at the acquisition step; and a display step of displaying the battery information that is stored at the storing step, wherein the display step displays the battery information of a battery that is not accommodated in the battery chamber.

In a fifth aspect of the present invention, there is provided a method for controlling an electronic apparatus having a battery lid adapted to close a battery chamber that accommodates a battery and an opening/closing detection device adapted to detect opening/closing of the battery lid; comprising: a first acquisition step of acquiring battery information of the battery when the opening/closing detection device detects that the battery lid opens; a second acquisition step of acquiring battery information of the battery when the opening/closing detection device detects that the battery lid closes; a storing step of storing the battery information acquired at the first acquisition step and the battery information acquired at the second acquisition step; and a display step of displaying the battery information stored at the storing step, wherein the display step displays the battery information of a battery that is not accommodated in the battery chamber.

In a sixth aspect of the present invention, there is provided a method for controlling an electronic apparatus having a battery chamber that accommodates a battery; comprising: an acquisition step of acquiring battery information of the battery that is accommodated in the battery chamber; a storing step of storing the battery information acquired at the acquisition step; and a display step of displaying the battery information stored at the storing step, wherein the display step displays the battery information of a battery that is accommodated in the battery chamber and the battery information of a battery that is not accommodated in the battery chamber at the same time.

According to the present invention, it is possible to check a remaining battery capacity without requiring the battery to be loaded into electronic apparatus.

The above and other objects, features, and advantages of the invention will become more apparent from the following detailed description taken in conjunction with the accompanying drawings.

BRIEF DESCRIPTION OF THE DRAWINGS

FIG. 12 is a view showing a third example of remaining battery capacity indication on the electronic camera shown in FIG. 1.

FIG. 13 is a view showing an example of an aspect of a battery that is loaded in the electronic camera of FIG. 1.

FIG. 14 is a view showing an example of a battery information table in the electronic camera of FIG. 1.

DETAILED DESCRIPTION OF THE PREFERRED EMBODIMENTS

The present invention will now be described in detail with reference to the drawings showing preferred embodiments thereof.

Figure 1:
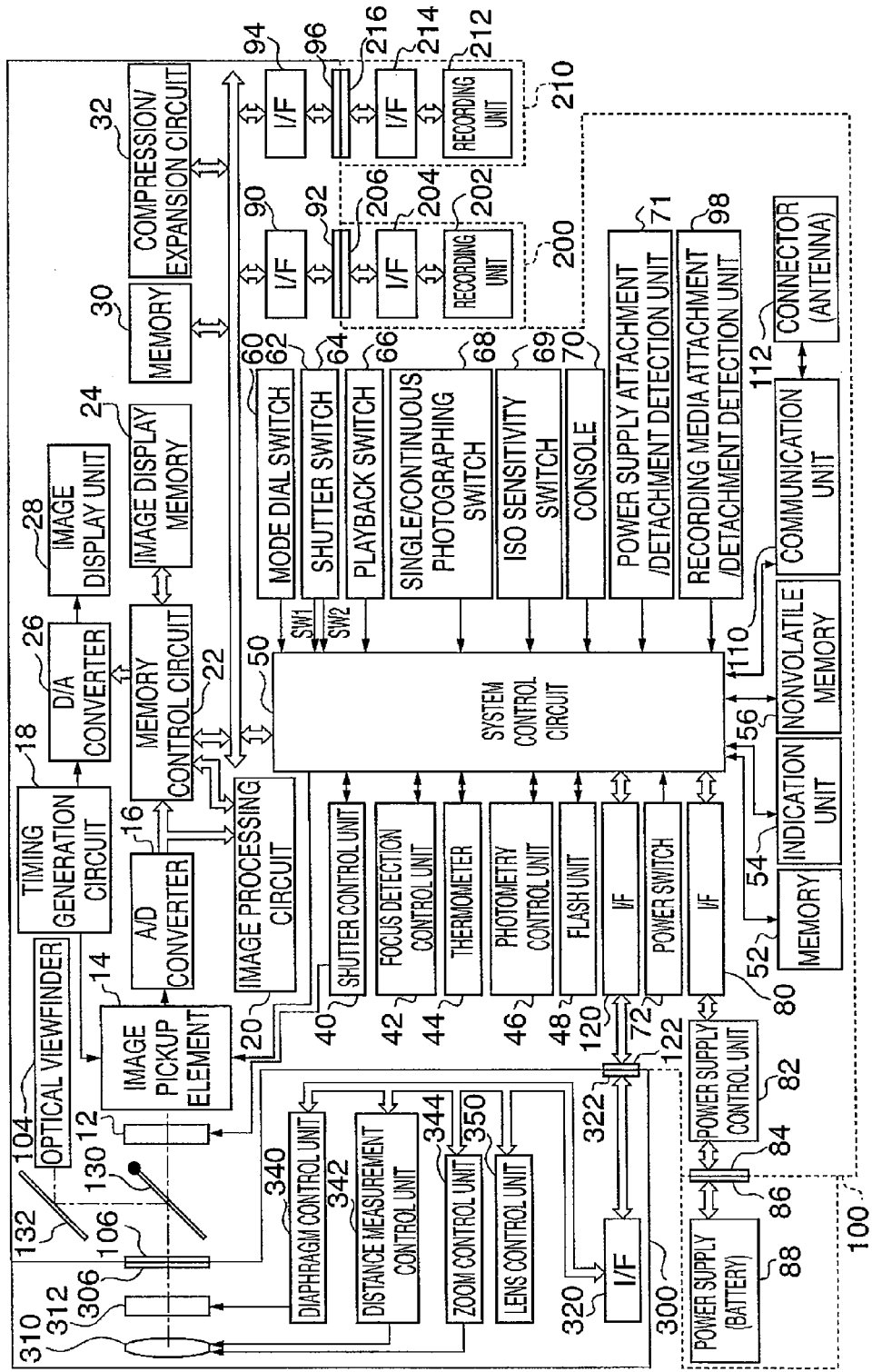
FIG. 1 is a block diagram showing a configuration of an electronic camera which exemplifies an electronic apparatus according to an embodiment of the present invention.

FIG. 1 is a block diagram showing a configuration of an electronic camera which exemplifies the electronic apparatus according to an embodiment of the present invention.

In FIG. 1, the electronic camera includes an image processing apparatus 100, a recording medium 200, 210, and a lens unit 300.

A description will be given of a detailed configuration of the electronic camera of FIG. 1 in conjunction with operation.

A shutter 12 has a function of controlling the exposure amount of an image pickup element 14. The image pickup element 14 converts an optical image into electric signals.

Light rays that have entered a photographing lens 310 in the lens unit 300 are guided onto the image pickup element 14 via a diaphragm 312, lens mounts 306 and 106, and the shutter 12 by a single-lens reflex system, and form an optical image on the image pickup element 14.

An A/D converter 16 converts an analog signal output from the image pickup element 14 into a digital signal. A timing generation circuit 18 supplies clock signals and control signals to the image pickup element 14, the A/D converter 16, and a D/A converter 26. The timing generation circuit 18 is controlled by a memory control circuit 22 and a system control circuit 50.

An image processing circuit 20 performs a predetermined pixel interpolation process and a predetermined color conversion process on data from the A/D converter 16 or the memory control circuit 22. The image processing circuit 20 makes predetermined computations using picked-up image data as needed.

The image processing circuit 20 executes a TTL (through the lens) process and an AF (auto-focus) process so that the system control circuit 50 controls an exposure (shutter) control unit 40 and a focus detection control unit 42 on the basis of the obtained computation result. The image processing circuit 20 also executes an AE (auto-exposure) process and an EF (flash light control) process. The image processing circuit 20 makes predetermined computations using picked-up image data and executes a TTL-AWB (auto white balance) process on the basis of the obtained computation result.

This embodiment has the focus detection control unit 42 and a photometry control unit 46 dedicated to those processes. Therefore, the system control circuit 50 may perform the AF, AE, and EF processes by using the focus detection control unit 42 and the photometry control unit 46 instead of using the image processing circuit 20.

Alternatively, the system control circuit 50 may perform the AF, AE, and EF processes by using the image processing circuit 20 in addition to those using the focus detection control unit 42 and the photometry control unit 46.

The memory control circuit 22 controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or the memory 30 via the image processing circuit 20 and the memory control circuit 22 or directly via the memory control circuit 22.

An image display unit 28 includes a TFT-LCD. Display image data written in the image display memory 24 is displayed on the image display unit 28 via the D/A converter 26. For the purpose of displaying picked-up image data on the image display unit 28 as needed, an electronic viewfinder function can be implemented.

The image display unit 28 displays not only image data but also each type of setting information and remaining battery capacity indication. When the remaining battery capacity indication is to be performed, the system control circuit 50 displays an image via the D/A converter 26 by generating data and writing the data in the image display memory 24 via the memory control circuit 22.

The image display unit 28 can arbitrarily turn on/off its display in accordance with an instruction from the system control circuit 50. When the display is turned off, great power savings of the image processing apparatus 100 can be achieved.

The memory 30 is for storing photographed still or moving images. The memory 30 has a sufficient capacity for storing a predetermined number of still images or a moving image for a predetermined period of time. Hence, even in a continuous photographing mode for continuously photographing a plurality of still images or a panorama mode, a large number of images can be written in the memory 30 at a high speed. Also, the memory 30 can be used as a work area of the system control circuit 50.

A compression/expansion circuit 32 is for compressing/expanding image data by the adaptive discrete cosine transform (ADCT) or the like. The compression/expansion circuit 32 reads an image stored in the memory 30, compresses or expands it, and writes the compressed or expanded data in the memory 30.

The shutter control unit 40 controls the shutter 12 on the basis of photometry information from the photometry control unit 46 in cooperation with a diaphragm control unit 340 that controls the diaphragm 312. The focus detection control unit 42 for executing the AF process has light rays, which have entered the photographing lens 310 in the lens unit 300, entered therein via the diaphragm 312, the lens mounts 306 and 106, the mirror 130, and a focus detection sub-mirror (not shown) by the single-lens reflex system, thus measuring the focusing state of an image formed as an optical image.

A thermometer 44 detects the ambient temperature of the photographing environment. When the thermometer 44 is built in the image pickup element 14, the dark current can be estimated more correctly than otherwise.

The photometry control unit 46 for executing the AE process has light rays, which have entered the photographing lens 310 in the lens unit 300, entered therein via the diaphragm 312, the lens mounts 306 and 106, the mirror 130, and a photometry sub-mirror by the single-lens reflex system, thus measuring the exposure state of an image formed as an optical image.

The photometry control unit 46 also has an EF process function in cooperation with a flash unit 48. The flash unit 48 has a function of projecting AF assist light, and a flash light control function.

As mentioned above, the system control circuit 50 may perform controls below on the basis of the results of computations made by the image processing circuit 20 using image data picked up by the image pickup element 14. Specifically, the system control circuit 50 can perform the exposure control and the AF control using a video TTL scheme on the shutter control unit 40, the diaphragm control unit 340, and a focus detection control unit 342.

Furthermore, the AF control may be done using both the measurement result of the focus detection control unit 42 and the computation result of image data picked up by the image pickup element 14 by the image processing circuit 20. Moreover, the exposure control may be done using both the measurement result of the photometry control unit 46 and the computation result of image data picked up by the image pickup element 14 by the image processing circuit 20.

A system control circuit 50 for controlling over the image processing apparatus 100 incorporates a known CPU and the like. Memory 52 stores constants, variables, programs and the like required for operating the system control circuit 50.

An indication unit 54 has a liquid crystal display device (LCD), a loudspeaker and the like for indicating the operation state, messages and the like using characters, images, sounds and the like in accordance with execution of programs in the system control circuit 50. The indication unit 54 is set at one or more easy-to-see positions around the console of the image sensing apparatus 100.

The indication unit 54 is constructed by a combination of an LCD, LEDs, a sound generation element, and the like. Some functions of the indication unit 54 are set within an optical viewfinder 104.

Of the indication contents of the indication unit 54, those displayed using the LCD or the like include a single/continuous photographing indication, a self timer indication, a compression ratio indication, a recording pixel count indication, a recorded image count indication, a remaining possible-to-photograph image count indication, a shutter speed indication, an aperture value indication, and an exposure correction indication.

Also included are a flash indication, a red-eye suppression indication, a macro photographing indication, a buzzer setup indication, an error indication, an information indication using numerals of a plurality of digits, an attachment/detachment indication of recording media 200 and 210, an attachment/detachment indication of lens unit 300, and a communication I/F operation indication. Further included are a date/time indication, a connection indication with an external computer and the like.

Of the indication contents of the indication unit 54, those displayed within the optical viewfinder 104 include an in-focus indication, a photographing ready indication, a camera shake alert indication, a flash charging indication, a flash charging completion indication and the shutter speed indication. Also included are the aperture value indication, the exposure correction indication and a recording medium write access indication.

Furthermore, of the indication contents of the indication unit 54, those displayed using the LEDs and the like include, e.g., the in-focus indication, the photographing ready indication, the camera shake alert indication, the flash charging indication, the flash charging completion indication and the recording medium write access indication. Also included are macro photographing setup notification and a secondary battery charging state indication.

Of the indication contents of the indication unit 54, those indicated by lamps and the like include, e.g., self timer notification. The self timer notification may be commonly used as an AF assist light.

A nonvolatile memory 56 is electrically erasable/programmable and stores programs (to be described later) and the like. The nonvolatile memory 56 may be a flash memory, an EPROM or the like.

Switches 60, 62, 64, 66, 68, and 69 and a console 70 are for inputting various operation instructions of a system control circuit 50. The switches and the console are constructed by one or more combinations of a switch, a dial, a touch panel, a pointer of sight detection, a voice recognition device, and the like. These operation units will be explained in detail below.

The mode dial switch 60 can set various function photographing modes including an automatic photographing mode, a programmed photographing mode, a shutter speed priority photographing mode, an aperture priority photographing mode, a manual photographing mode, a focal depth priority (depth) photographing mode and a portrait photographing mode. The mode dial switch 60 can also selectively set one of various function photographing modes; a landscape photographing mode, a closeup photographing mode, a sport photographing mode, a night scene photographing mode, a panorama photographing mode, and the like.

The shutter switch (SW1) 62 is turned on in the middle of operation on a shutter button (not shown), and instructs to start the AF process, the AE process, the AWB process, the EF process, and the like.

The shutter switch (SW2) 64 is turned on upon completion of operation on the shutter button (not shown). The shutter switch (SW2) 64 instructs to start a series of processes including an exposure process for writing a signal read out from the image pickup element 14 into the memory 30 via the A/D converter 16 and the memory control circuit 22, and a development process using computations in the image processing circuit 20 and memory control circuit 22. The shutter switch (SW2) 64 also instructs to start a series of process of a recording process for reading out image data from the memory 30, compressing the read out image data by the compression/expansion circuit 32, and writing the compressed image data into the recording medium—200 or 210.

The playback switch 66 instructs to start playback operation for reading out an image photographed in a photographing mode state from the memory 30 or the recording medium 200 or 210, and displaying the read out image on the image display unit 28.

The single/continuous photographing switch 68 can set either a single photographing mode for photographing one frame of image in response to depression of the shutter switch SW2 and then transferring to a standby state; or a continuous photographing mode for continuously photographing images while the shutter switch SW2 is held down.

The ISO sensitivity switch 69 can set ISO sensitivity by changing gain setting in the image pickup element 14 or the image processing circuit 20.

The console 70, which is made up with various buttons, a touch panel, and the like, includes: a menu button; a set button; a macro button; a multi-frame playback new page button; a flash setup button and a single shot/continuous shot/self timer switch button.

The console 70 also includes a menu move + (plus) button; a menu move − (minus) button; a playback image move + (plus) button; a playback image move − (minus) button; a photographed image quality select button; an exposure correct button and a date/time setup button.

The console 70 further includes a select/change button for selecting and changing various functions upon executing photographing and playback in, e.g., the panoramic mode; and a determine/execute button for determining and executing various functions upon executing photographing and playback in, e.g., the panoramic mode.

The console 70 also includes an image display ON/OFF switch for turning on/off the image display unit 28; and a quick review ON/OFF switch for setting a quick review function of automatically playing back photographed image data immediately after the photographing.

The console 70 also includes a compression mode switch for selecting a compression ratio of JPEG compression, or selecting a RAW mode for directly converting a signal output from the image pickup element into digital data and recording the digital data in a recording medium.

The console 70 also includes a playback switch that can set various function modes such as a playback mode, a multi-frame playback/delete mode, a PC connect mode, and the like; and an AF mode setup switch. The AF mode setup switch can set a one-shot AF mode for starting auto-focus operation in response to depression of the SW1 and maintaining an in-focus state once it is attained, and a servo AF mode for continuously executing auto-focus operation while the SW1 is held down.

In place of the plus and minus buttons, a rotary dial switch may be used for much more smooth selection of numerical values and functions.

The power supply attachment/detachment detection unit 71 is a unit for detecting whether the battery or the power supply is attached to or detached from the body or not. Output from the detection switch of the power supply attachment/detachment detection unit 71 is connected to the system control circuit 50.

Figure 15:
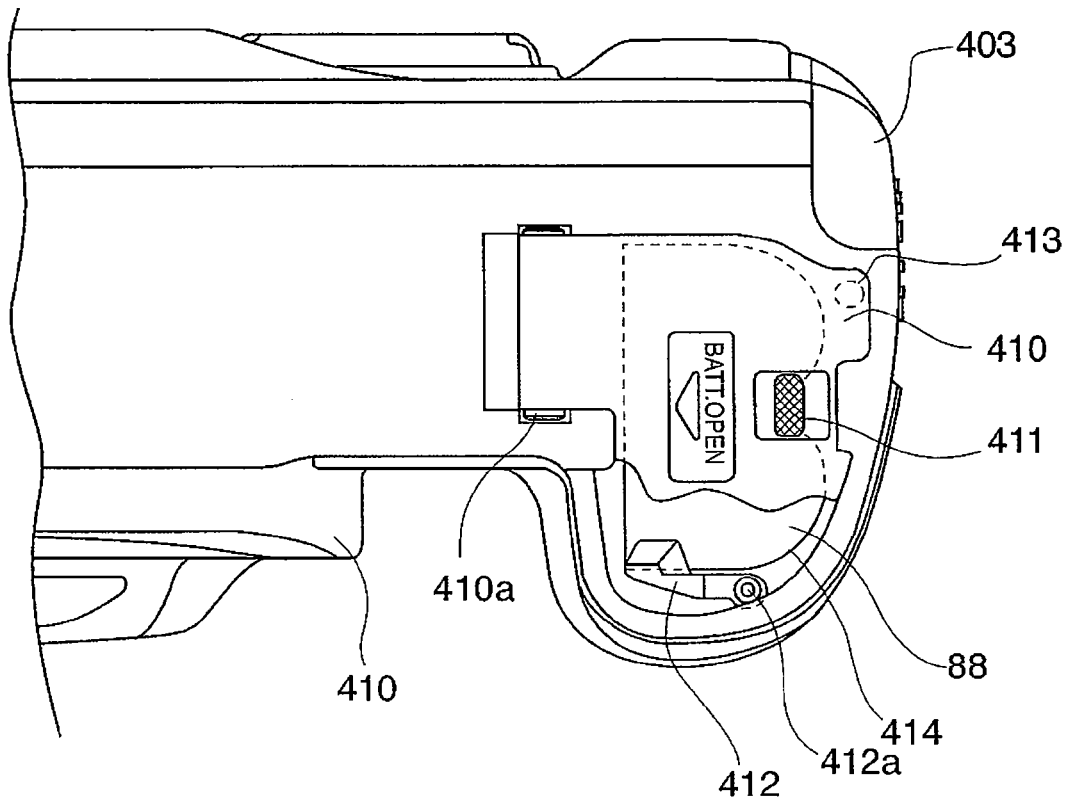
FIG. 15 is a view illustrating the power supply attachment/detachment detection unit 71 shown in FIG. 1 in detail.
Figure 16:
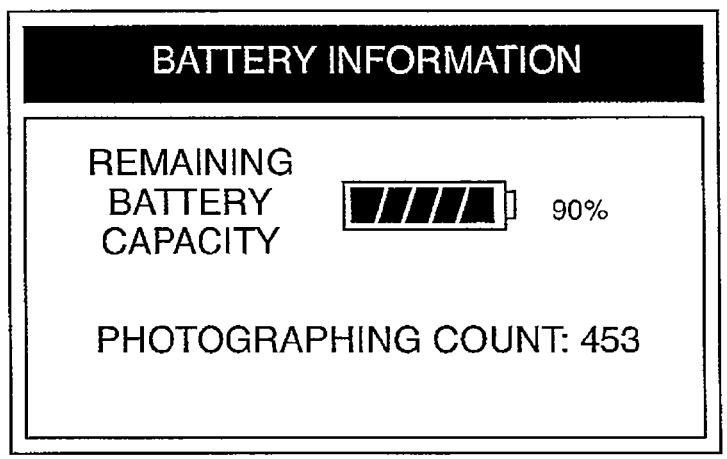
FIG. 16 is a view showing an example of remaining battery capacity indication on a conventional electronic apparatus.

Now, the power supply attachment/detachment detection unit will be described with reference to FIG. 15. FIG. 15 is a view illustrating a bottom view of the digital still camera, to which the present invention is applied. Reference numeral 410 denotes a battery lid for closing a battery chamber 414 (liding indicated part). In the figure, for the purpose of illustration, a part of the battery lid is broken to show behind it. A battery 88 is loaded in the battery chamber 414. The battery 88 can be attached downward into and detached upward from the battery chamber 414.

The battery lid 410 is pivotally connected to a camera body 401 on a hinge axis 410a fixed to the camera body 401. FIG. 15 shows that the battery lid 410 is in the closes state. Reference numeral 411 denotes an unlatching tong (meshed part) which is used for opening the battery lid 410. When the unlatching tong 411 is moved left in the figure, the closed battery lid 410 is unlatched.

Reference numeral 412 denotes a battery lock lever, which is pivotally connected to the camera body 401 on a hinge axis 412a. FIG. 15 shows the tip of the battery lock lever 412 partially overlapping the battery 88 so as to indicate a state where the battery lock lever 412 locks a battery 202 against the attachment/detachment direction (the upward and downward direction of the camera), i.e., where the battery lock lever 412 ensures the battery 88 kept in the accommodated position even when the battery lid 410 is opened.

Reference numeral 413 denotes a battery lid opening/closing detection switch, with the moving shaft tip of the switch for detecting whether the battery lid 410 opens or closes shown by a dotted line. The moving shaft is adapted to move in the vertical direction of the figure surface (the upward and downward direction of the camera). Operation performed to remove the battery 88 from the battery chamber 414 will be described. In order to open the battery lid 410, a camera user first moves the unlatching tong 411 to the left to unlatch the battery lid 410 which is latched to the camera body 401. Then the user pivots the battery lid 410 on the hinge axis 410a.

When the user opens the battery lid 410, the moving shaft of the battery lid opening/closing detection switch 413 is released from the state where it is depressed behind the battery lid 410, and it is detected that the battery lid 410 opens. At this moment, the battery 88 never immediately jumps out from the accommodated state which connects with the power supply connecting side (not shown) by the operation of the batter lock lever 412. Accordingly, when the battery lid opening/closing detection switch 413 detects that the battery lid 410 opens, the power supply of the camera is securely kept in continuity. Next, the user removes the battery 88 by rotating the battery lock lever 412 counter-clockwise to move the tip of the batter lock lever 412 out from the track of the battery 88 being removed (to eliminate the overlapping state). Operation performed to accommodate the battery 88 into the battery chamber 414 is such that the user makes the batter lock lever 412 out of the overlapped state and inserts the battery 88 into the battery chamber 414. When the battery 88 is inserted in the battery chamber 414, the tip of the batter lock lever 412 abuts against the end face of the battery 88. When the battery lid 410 is then, turned in the closing direction, the moving shaft of the battery lid opening/closing detection switch 413 is depressed behind the battery lid 410 and then the battery lid 410 is latched. With this mechanism, the battery lid opening/closing detection switch 413 can detect the opening/closing state of the battery lid 410.

A power switch 72 can selectively set power-on and power-off modes of the image processing apparatus 100. The power switch 72 can also selectively set power-on and power-off modes of various accessories such as the lens unit 300, an external electronic flash, recording media 200 and 210 and the like, which are connected to the image processing apparatus 100.

A power supply control unit 82 is made up with a battery detection circuit, a DC-DC converter, a switch circuit for switching a block to be energized, and the like. The power supply control unit 82 detects the presence, the type, and the remaining capacity of a loaded battery, controls the DC-DC converter on the basis of such detection results and an instruction from the system control circuit 50, and supplies a required voltage to the respective units including the recording media for a required period of time.

The power supply 88 and the power supply control unit 82, which include a primary battery such as an alkali battery, a lithium battery or the like and a secondary battery such as an NiCd battery, a NiMH battery, a Li-ion secondary battery or the like, are connected by connectors 84 and 86. Although in this embodiment, the power supply 88 is assumed to be the Li-ion secondary battery, there is no intention to limit the battery to any specific type.

FIG. 13 shows an example of the Li-ion secondary battery. The Li-ion secondary battery in the embodiment has the unique ID in the lower right part of the top surface.

Interfaces (I/F) 90 and 94 are interfaces with recording media such as a memory card, a hard disk, and the like. Connectors 92 and 96 connect with recording media such as a memory card, a hard disk, and the like. A recording medium attachment/detachment detection unit 98 detects whether the recording medium 200 or 210 is attached to the connector 92 and/or the connector 96 or not.

Although this embodiment has two sets of interfaces and connectors that receive the recording media, one or an arbitrary number of sets of interfaces and connectors that receive the recording media may be equipped. As interfaces and connectors of different standards, those complying with the standards of a PCMCIA card, a CF (Compact Flash (Registered Trademark)) card, and the like may be used.

Furthermore, when the interfaces 90 and 94, and connectors 92 and 96 use those complying with the standards of a PCMCIA card, a CF card, and the like, and various cards shown below are connected thereto, transfer control shown below can be realized. Specifically, image data and management information associated with the image data can be transferred to and from another computer or peripheral devices such as a printer and the like.

Various communication cards such as a LAN card, a modem card, a USB card, an IEEE1394 card, a SCSI card, a PHS, and the like may be connected.

The optical viewfinder 104 can guide light rays that have entered the photographing lens 310 via the diaphragm 312, the lens mounts 306 and 106, and the mirror 130 and a mirror 132 by the single-lens reflex system, and form and display them as an optical image.

In this manner, without using the electronic viewfinder function implemented by the image display unit 28, photographing can be done using the optical viewfinder 104 alone. In the optical viewfinder 104, some functions of the indication unit 54, e.g., various functions such as the in-focus indication, the camera shake alert indication, the flash charging indication, the shutter speed indication, the aperture value indication, the exposure correction indication, and the like are provided.

A communication unit 110 has various communication functions such as RS232C, USB, IEEE1394, SCSI, modem, LAN, radio communication, and the like. A connector 112 is for connecting the image processing apparatus 100 with another device using the communication unit 110. The connector 112 may be an antenna in case of radio communications.

An interface 120 is for connecting the image processing apparatus 100 to the lens unit 300 in the lens mount 106. A connector 122 electrically connects the image processing apparatus 100 to the lens unit 300.

The connector 122 also has a function of exchanging control signals, status signals, data signals, and the like between the image processing apparatus 100 and lens unit 300, and supplying currents of various voltages. The connector 122 may communicate not only electrical signals but also optical signals, audio signals, and the like.

The mirrors 130 and 132 guide light rays that have entered the photographing lens 310 to the optical viewfinder 104 by the single-lens reflex system. The mirror 132 may be either a quick return mirror or half mirror.

The recording medium 200 are such as a memory card, a hard disk, or the like. The recording medium 200 has a recording unit 202 made up with semiconductor memory, a magnetic disk, or the like; an interface 204 with the image processing apparatus 100; and a connector 206 for connecting the image processing apparatus 100.

The recording medium 210 is such as a memory card, hard disk, or the like as the recording medium 200 is. The recording medium 210 has a recording unit 212 made up with semiconductor memory, a magnetic disk, or the like; an interface 214 with the image processing apparatus 100; and a connector 216 for connecting the image processing apparatus 100.

The lens unit 300 is an exchangeable lens type lens unit. The lens mount 306 mechanically couples the lens unit 300 to the image processing apparatus 100. The lens mount 306 includes various functions of electrically connecting the lens unit 300 and image processing apparatus 100.

An interface 320 is for connecting the lens unit 300 to the image processing apparatus 100 in the lens mount 306. The connector 322 electrically connects the lens unit 300 to the image processing apparatus 100.

The connector 322 also has a function of exchanging control signals, status signals, data signals, and the like between the image processing apparatus 100 and lens unit 300, and receiving or supplying currents of various voltages. The connector 322 may communicate not only electrical signals but also optical signals, audio signals, and the like.

The diaphragm control unit 340 for controls the diaphragm 312 on the basis of photometry information from the photometry control unit 46 in cooperation with the shutter control unit 40 that controls the shutter 12. The focus detection control unit 342 controls focusing of the photographing lens 310.

A zoom control unit 344 controls zooming of the photographing lens 310. A lens control unit 350 controls over the lens unit 300. The lens control unit 350 has a memory function of storing constants, variables, programs, and the like for operation. The lens control unit 350 also has a nonvolatile memory function of holding identification information such as a number or the like unique to the lens unit 300; management information; function information such as a full-aperture value, a minimum aperture value, a focal length, and the like; each of current and past setup values and the like.

An interface 80 is provided between the power supply control unit 82 and the system control circuit 50. To the system control circuit 50, the power supply attachment/detachment detection unit 71 is connected.

Figure 2:
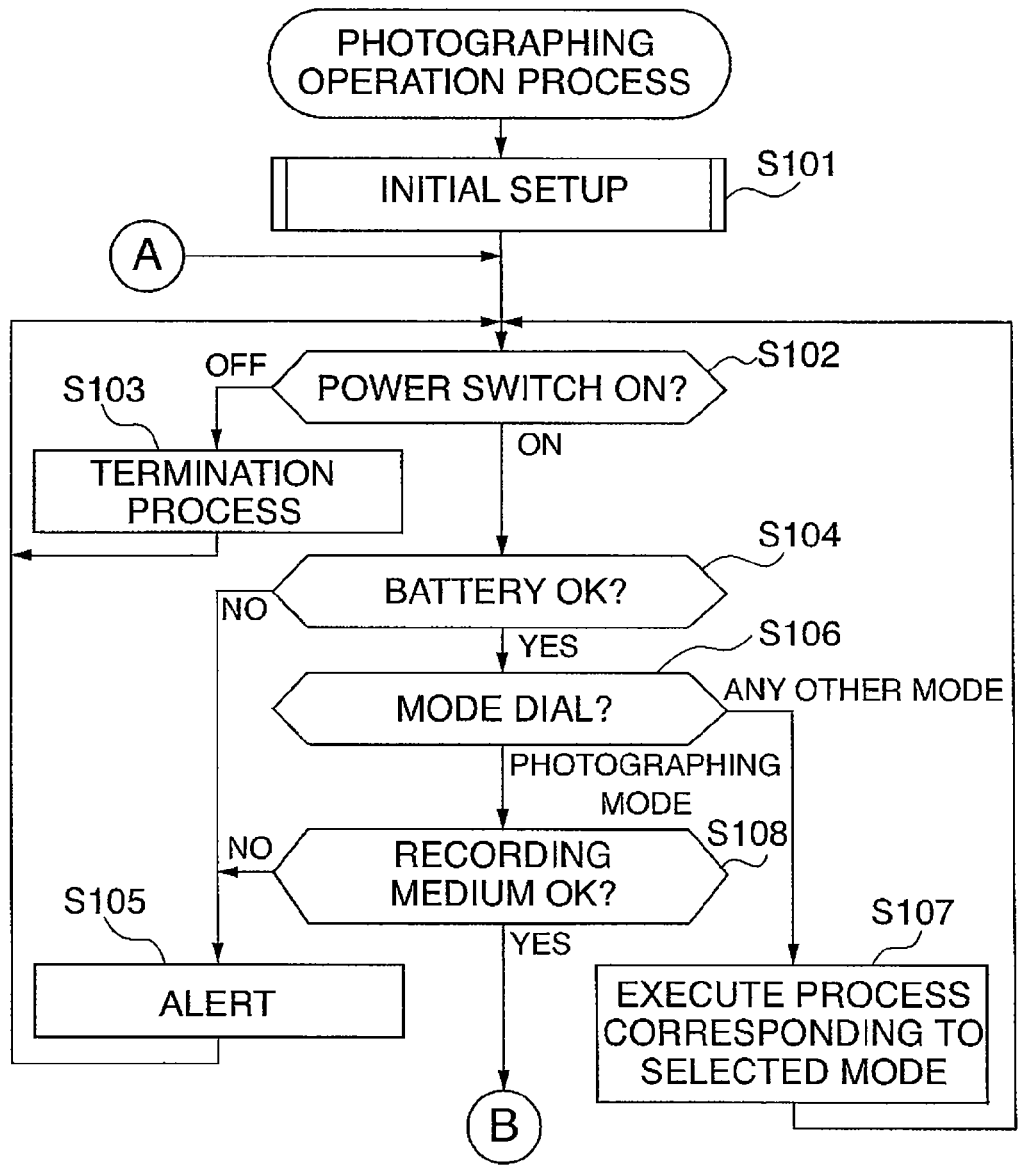
FIG. 2 is a flowchart showing the procedure a photographing operation process that is performed by the image processing apparatus shown in FIG. 1.
Figure 3:
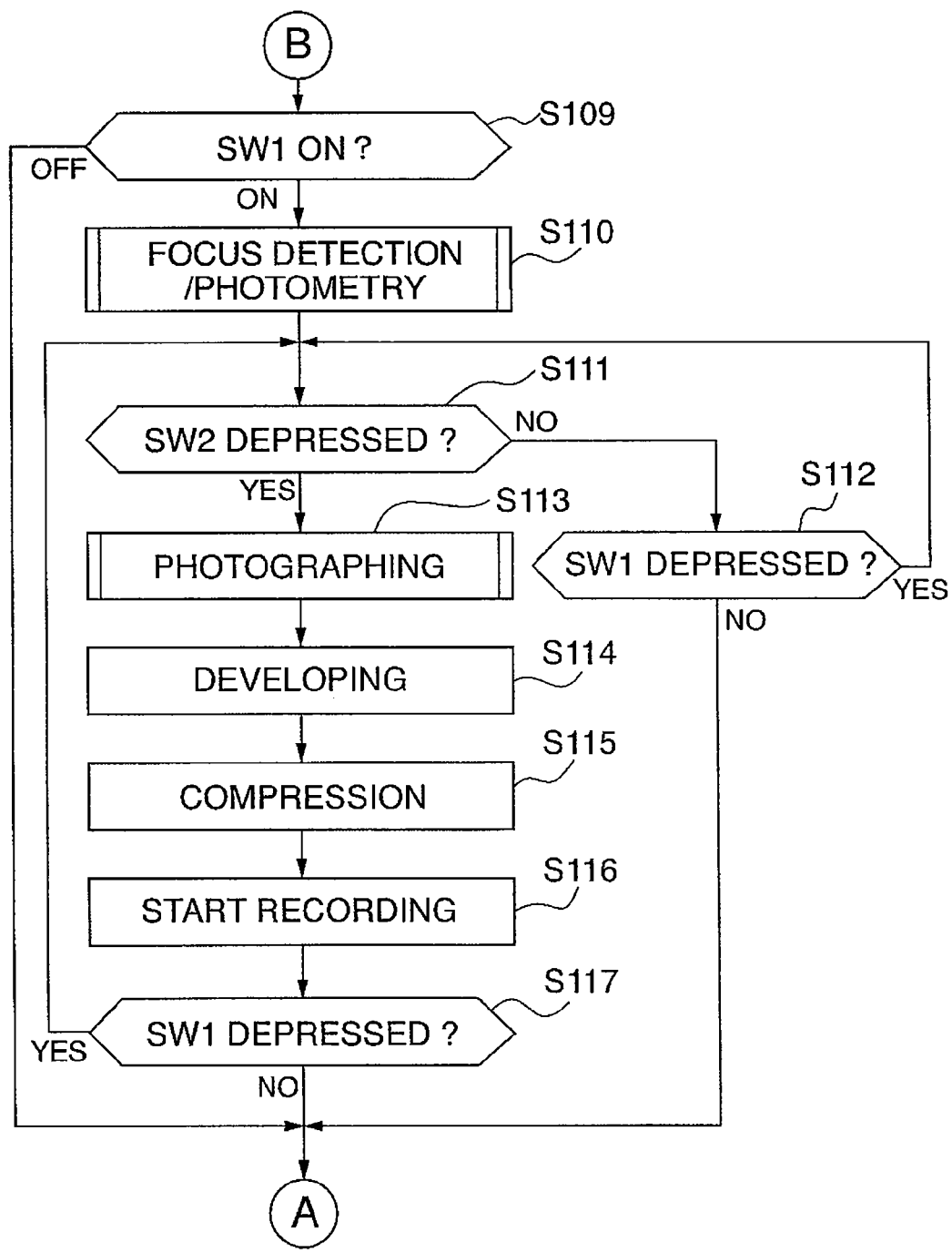
FIG. 3 is a flowchart showing the procedure the photographing operation process that is performed by the image processing apparatus shown in FIG. 1.

The operation of the electronic camera with the abovementioned configuration will be explained. FIGS. 2 and 3 are flowcharts showing the procedure of the photographing operation process that is performed by the image processing apparatus 100. This processing program is stored in a storage medium such as the nonvolatile memory 56, loaded onto the memory 52, and executed by the CPU in the system control circuit 50.

In FIG. 2, in response to power on after battery exchange or the like, the system control circuit 50 initializes flags, control variables, and the like and also performs initial setup process described later with reference of FIG. 4, on the respective units of the image processing apparatus 100 (step S101). The system control circuit 50 determines the setup position of the power switch 72 to determine whether or not the power switch 72 is set to power off (step S102).

If the power switch 72 is set to power off, the system control circuit 50 changes the indications of the respective indication units to an end state, and records (stores) required parameters and setup values including flags, control variables, and the like, and the currently selected mode in the nonvolatile memory 56. Then, the system control circuit 50 performs a predetermined termination process such as cutting off unnecessary power supply to the respective units of the image processing apparatus 100 including the image display unit 28 by the power supply control unit 82, and so forth (step S103), followed by the program returning to the step S102.

If the power switch 72 is set to power on, the system control circuit 50 determines whether or not the remaining capacity and operation state of the power supply 88 such as batteries and the like pose any problem in the operation of the image processing apparatus 100 by using the power supply control unit 82 (step S104). If it is determined that there is a problem (NO to the step S104), a predetermined alert indication is made by means of display of an image or an output of voice using the indication unit 54 (step S105), followed by the program returning to the step S102.

If it is determined that there is no problem in the power supply 88 (YES to the step S104), the system control circuit 50 identifies the setup position of the mode dial switch 60 to determine whether or not the mode dial switch 60 is set to any one of the photographing modes (step S106). If the mode dial switch 60 is set to any other mode, the system control circuit 50 executes a process corresponding to the selected mode (step S107), followed by the program returning to the step S102.

On the other hand, if the mode dial switch 60 is set to any one of the photographing modes, the system control circuit 50 determines whether or not the recording medium 200 or 210 is attached. The system control circuit 50 also determines whether or not management information of image data recorded on the recording medium 200 or 210 has been acquired. Further, the system control circuit 50 determines whether or not the operation state of the recording medium 200 or 210 poses any problem in the operation of the image processing apparatus 100, in particular, recording/playback of image data to/from the recording medium (step S108).

If it is determined that any problem is found (NO to the step S108), a predetermined alert indication is made by means of display of an image or an output of voice using the indication unit 54 (step S105), followed by the program returning to the step S102.

Next, in FIG. 3, it is determined whether or not the shutter switch SW1 is depressed (step S109). If the shutter SW1 is not depressed, the program returns to the step S102.

On the other hand, if the shutter switch SW1 is depressed, the system control circuit 50 executes a focus detection/photometry process described later with reference to FIG. 5 (step S110). The focus detection process is for focusing the photographing lens 310 on an object and also the photometry process is for determining an aperture value and a shutter speed. In the photometry process, the electronic flash is set if necessary. The focus detection/photometry process will be described in detail later.

Then, it is determined whether or not the shutter switch SW2 is depressed or not (step S111). If the shutter switch SW2 is not depressed, it is further determined whether or not the shutter switch SW1 is released (step S112).

The processes in the steps S111 and S112 are repeated until the shutter switch SW1 is released or the shutter switch SW2 is depressed. If the shutter switch SW 1 is released in the step S112, the program returns to the step S102.

As a result of the determination in the step S111, when the shutter switch SW2 is depressed, the system control circuit 50 executes the photographing process to thereby read out photographed image data written in a predetermined area of the memory 30 by using the memory control circuit 22 and the image processing circuit 20, as needed (step S113). Then, the system control circuit 50 executes various development processes including the AWB process, gamma conversion, color conversion, and the like by using the computation results stored in its internal memory or the memory 52 (step S114).

The system control circuit 50 reads out image data written in the predetermined area of the memory 30, and causes the compression/expansion circuit 32 to execute an image compression process in accordance with the selected mode. Then, the system control circuit 50 writes the image data, which has photographed and undergone a series of processes, into a free image space of an image storage buffer area on the memory 30 (step S115).

The system control circuit 50 reads out the image data stored in the image storage buffer area on the memory 30, and subsequently starts a recording process for writing the image data which has been read out in the recording medium 200 or 210 such as a memory card, a Compact Flash (Registered Trademark) card, or the like via the interfaces 90 and 94 and the connectors 92 and 96 (step S116).

This recording start process is executed on new image data, which has been photographed and undergone a series of processes, each time that image data is written in a free image space of the image storage buffer area on the memory 30.

While the image data is written into the recording medium 200 or 210, a recording medium write access indication such as flashing an LED of the indication unit 54 is made to clearly indicate that the write access is currently underway.

The system control circuit 50 further determines whether or not the shutter switch SW1 is depressed (step S117). If the shutter switch SW1 is left released, the program returns to the step S102, whereas if the shutter switch SW1 is depressed, the program returns to the step S111, where the series of processes regarding photographing terminates.

Figure 4:
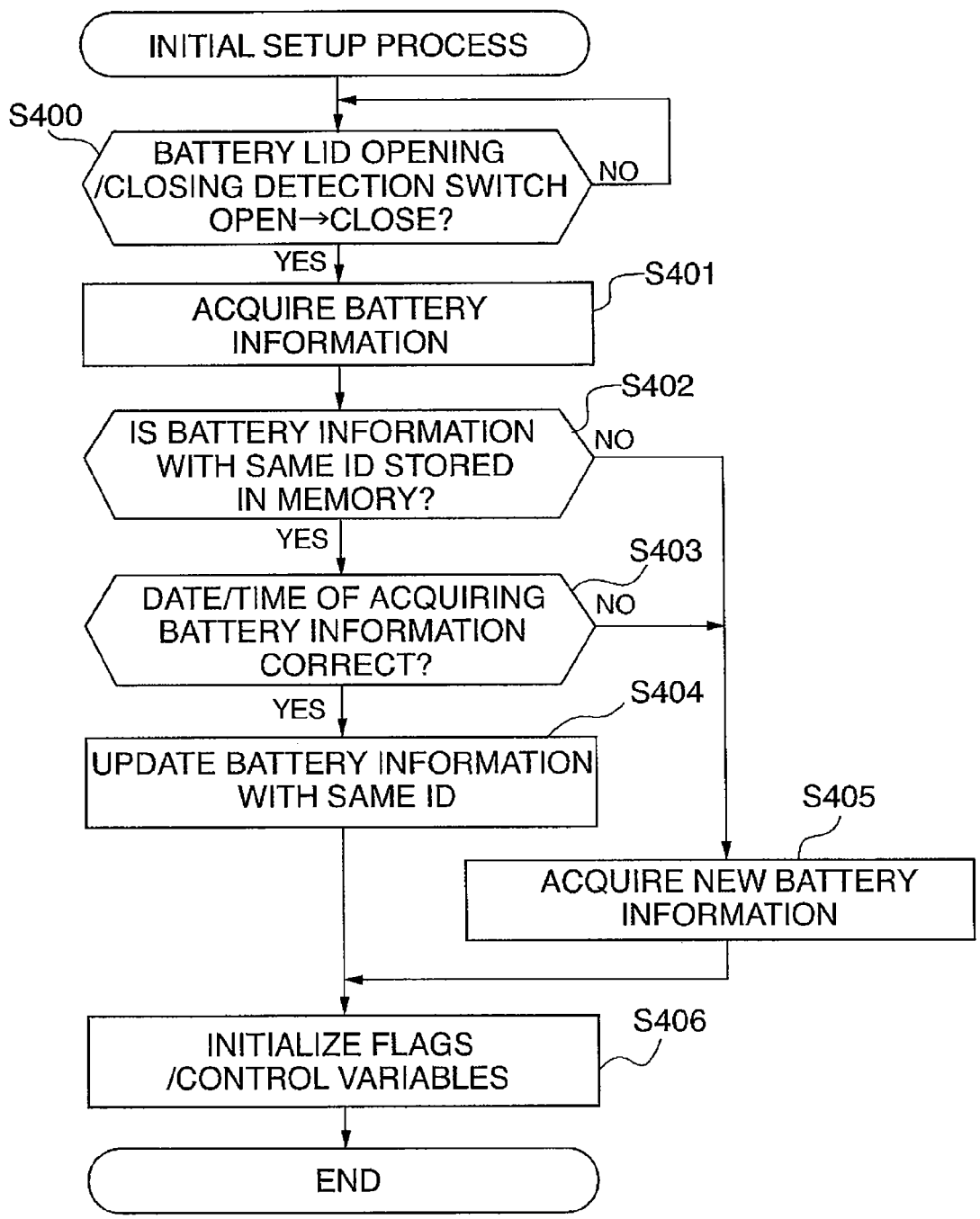
FIG. 4 is a flowchart showing the procedure an initial setup process that is performed in the step S101 in FIG. 2.

FIG. 4 is a flowchart showing the procedure an initial setup process that is performed in the step S101 in FIG. 2.

A description will be given of a sequence of acquiring battery information upon loading the battery into the camera, and writing the battery information into the nonvolatile memory 56 in the electronic apparatus, with reference to the flowchart.

In FIG. 4, when the battery is loaded into the camera before the battery lid 410 is closed, the battery lid opening/closing detection switch 413 changes from the open state to the closed state. The system control circuit 50 repeatedly detects whether or not the battery lid 410 changes from the open state to the closed state by using the battery lid opening/closing detection switch 413 (step S400). If it is detected that the battery lid 410 is closed in the step S400, the system control circuit 50 reads out the battery information on the currently loaded battery (step S401) (second acquisition device). Then, the system control circuit 50 checks whether or not battery information with the same ID as that of the read out battery information is stored in the nonvolatile memory 56 (step S402).

If the battery information with the same ID is stored, the system control circuit 50 determines whether or not the date/time of acquiring the battery information, which is stored in the nonvolatile memory 56, is correct (step S403). Specifically, the system control circuit 50 determines whether it is the normal value or the abnormal value by comparing the date/time of acquiring battery information with the current date/time information held in the camera body. As a result of the determination in the step S403, it is determined that the date/time of acquiring the battery information is correct, the system control circuit 50 updates the battery information with the same ID (step S404).

Next, in step S405, in a case where the battery information read out from the battery is battery information with an ID which is not stored in the nonvolatile memory 56, the system control circuit 50 writes the battery information read out from the battery into the nonvolatile memory 56. Then, the system control circuit 50 performs initial setup on flags and the like (step S406), followed by terminating the program.

Figure 5:
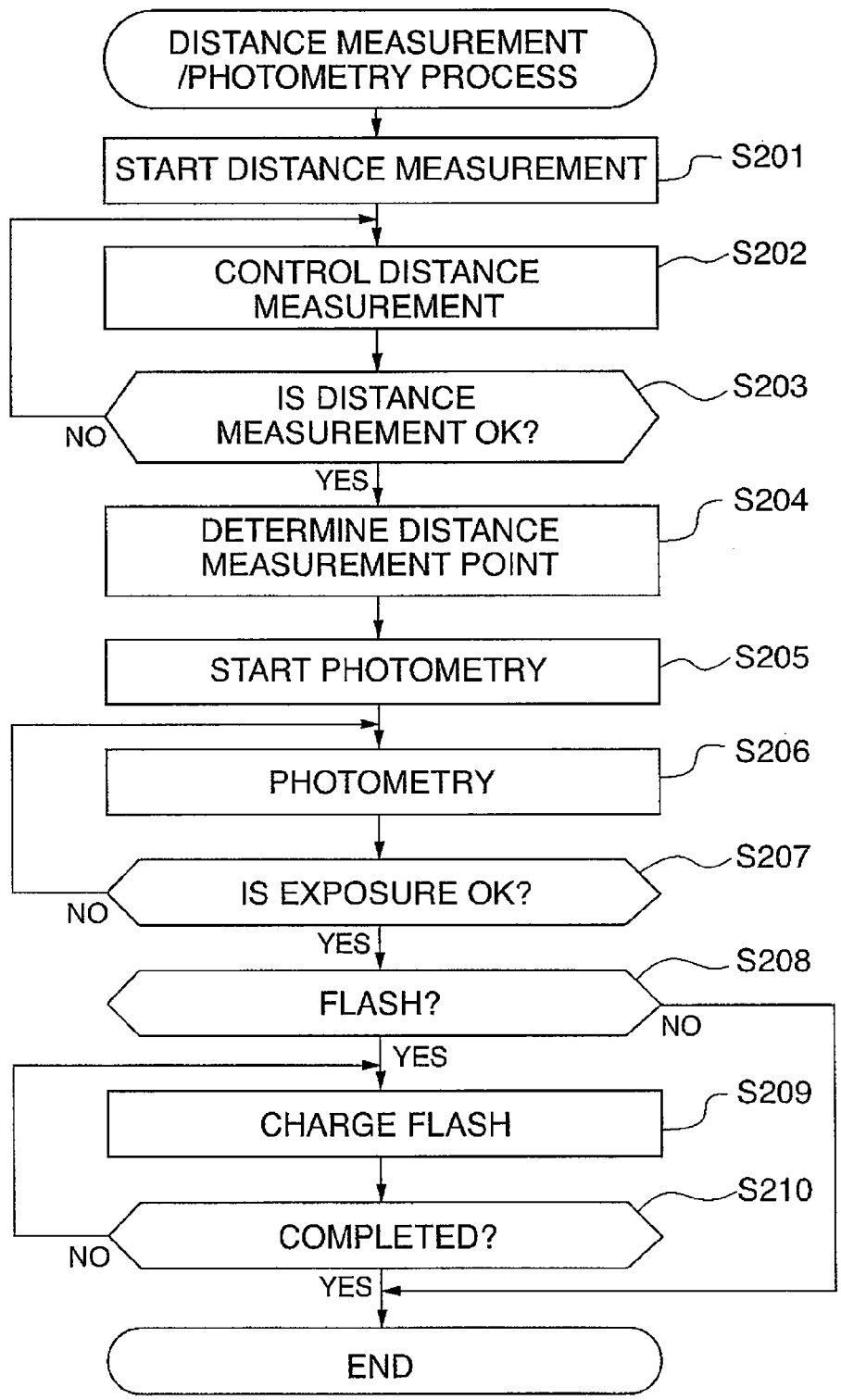
FIG. 5 is a flowchart showing the procedure a focus detection/photometry process that is performed in the step S110 in FIG. 3.

FIG. 5 is a flowchart showing the procedure the focus detection/photometry process that is performed in the step S110 in FIG. 3.

In the focus detection/photometry process, the system control circuit 50 and the diaphragm control unit 340 or the focus detection control unit 342 exchange various signals via the interface 120, the connectors 122 and 322, the interface 320, and the lens control unit 350.

In FIG. 5, the system control circuit 50 starts the AF process by using the image pickup element 14 and the focus detection control units 42 and 342 (step S201).

The system control circuit 50 executes the AF control for checking the focusing state of an image formed as an optical image by guiding light rays, which have entered the photographing lens 310, to the focus detection control unit 42 via the diaphragm 312, the lens mounts 306 and 106, the mirror 130, and the focus detection sub-mirror (not shown), and then detecting the focusing state by using the focus detection control unit 42 while driving the photographing lens 310 by using the focus detection control unit 342, until the focus detection result indicates an in-focus (steps S202, S203).

If the focus detection result indicates an in-focus in the step S203, the system control circuit 50 determines an in-focus focus detection point from focus detection points in a photographing screen, and stores focus detection data and/or setup parameters in its internal memory or the memory 52 together with the determined focus detection point data (step S204).

Subsequently, the system control circuit 50 starts the AE process by using the photometry control unit 46 (step S205). The system control circuit 50 executes the photometry process by using the exposure control unit 40 for measuring the exposure state of an image formed as an optical image by guiding light rays, which have entered the photographing lens 310, to the photometry control unit 46 via the diaphragm 312, the lens mounts 306 and 106, the mirrors 130 and 132, and the photometry lens (not shown) (steps S206), until it is determined that the exposure is appropriate (YES to the step S207).

As a result of the determination of the step S207, if it is determined that the exposure is appropriate, the system control circuit 50 stores photometry data and/or setup parameters in its internal memory or the memory 52.

The system control circuit 50 determines the aperture value (Av value) and the shutter speed (Tv value) in accordance with the exposure result detected by the photometry process in the step S206 and the image sensing mode selected by the mode dial switch 60.

The system control circuit 50 determines a charge accumulation time of the image pickup element 14 in accordance with the determined shutter speed, and executes the photographing process and a dark capture process in a charge accumulation time equal to the determined one.

The system control circuit 50 determines whether or not the electronic flash is needed to be operated in accordance with the photometry data obtained in the photometry process in the step S206 (step S208). If the electronic flash is needed to be operated, a flash flag is set and the flash unit 48 is charged to its full capacity (step S209). Subsequently, when the flash unit 48 is completely charged (YES to the step D210), the program terminates.

Figure 6:
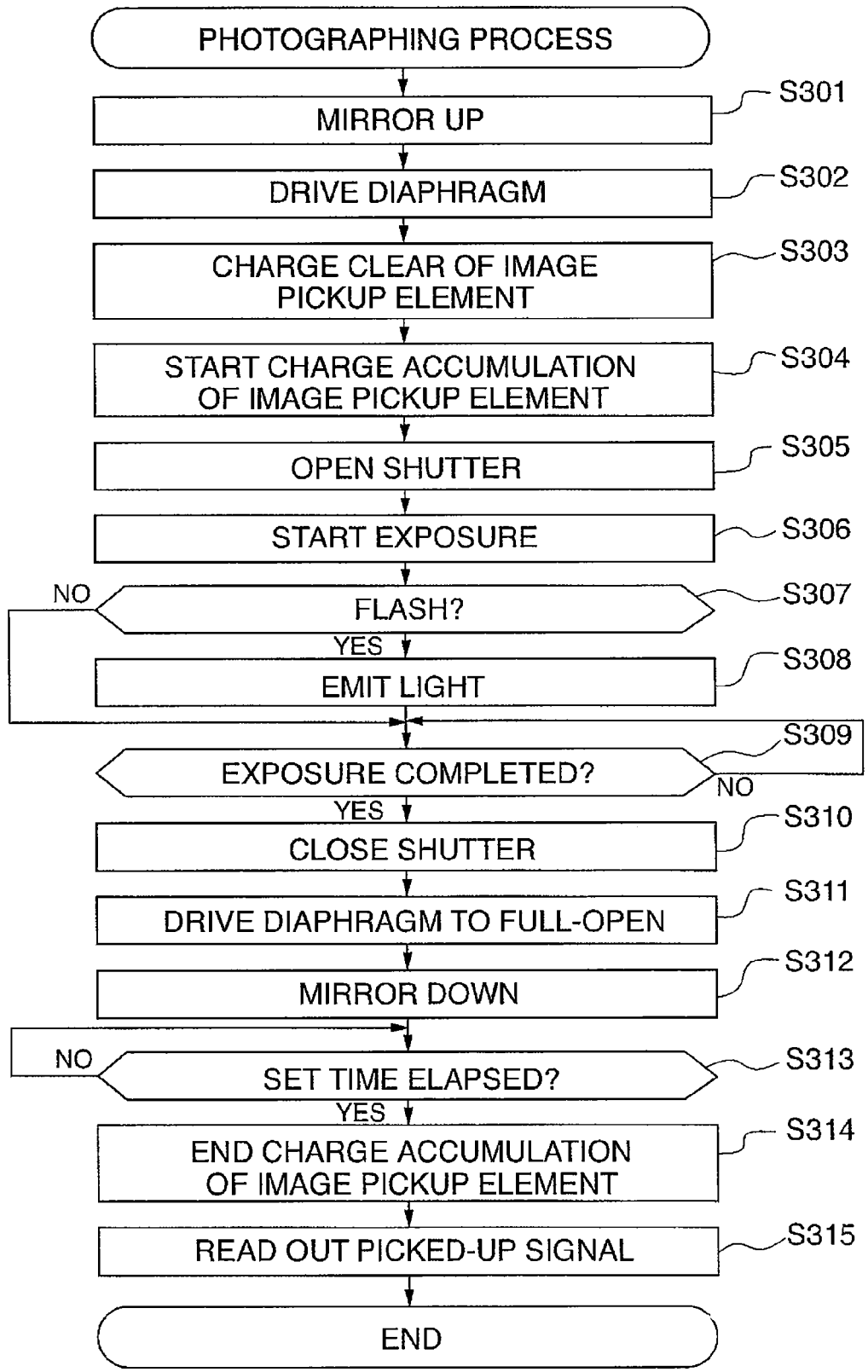
FIG. 6 is a flowchart showing the procedure a photographing process that is performed in the step S113 in FIG. 3.

FIG. 6 is a flowchart showing the procedure a photographing process that is performed in the step S113 in FIG. 3.

In this photographing process, the system control circuit 50 and the diaphragm control unit 340 or the focus detection control unit 342 exchange various signals via the interface 120, the connectors 122 and 322, the interface 320, and the lens control unit 350.

In FIG. 6, the system control circuit 50 moves the mirror 130 to a mirror up position by using a mirror driving unit (not shown) (step S301). Then, the system control circuit 50 drives the diaphragm 312 to a predetermined aperture value by the diaphragm control unit 340 in accordance with the photometry data stored in its internal memory or the memory 52 (step S302).

The system control circuit 50 performs charge clear operation on the image pickup element 14 (step S303), and then starts charge accumulation of the image pickup element 14 (step S304). Then, the system control circuit 50 opens the shutter 12 by the shutter control unit 40 (step S305), and starts exposure of the image pickup element 14 (step S306).

The system control circuit 50 determines whether or not the flash unit 48 is needed to be operated based on the flash flag (step S307), and if the flash unit 48 is needed to be operated, the system control circuit 50 controls the flash unit 48 to emit light (step S308).

The system control circuit 50 waits for the end of exposure of the image pickup element 14 in accordance with the photometry data (step S309). Upon completion of the exposure, the system control circuit 50 closes the shutter 12 by the shutter control unit 40 to end the exposure of the image pickup element 14 (step S310).

The system control circuit 50 drives the diaphragm 312 to a full-open aperture value by the diaphragm control unit 340 (step S311), and moves the mirror 130 to a mirror down position by the mirror driving unit (not shown) (step S312).

The system control circuit 50 determines whether or not the set charge accumulation time has elapsed (step S313). If the set charge accumulation time has elapsed, the system control circuit 50 ends the charge accumulation of the image pickup element 14 (step S314), and then reads out a charge signal from the image pickup element 14 (step S315).

Then, the system control circuit 50 writes photographed image data into a predetermined area of the memory 30 via the A/D converter 16, the image processing circuit 20, and the memory control circuit 22, or directly from the A/D converter 16 via the memory control circuit 22. Upon completion of a series of processes, the program terminates.

A description will be given of a battery information display process performed on the display unit of the electronic camera.

Figure 7:
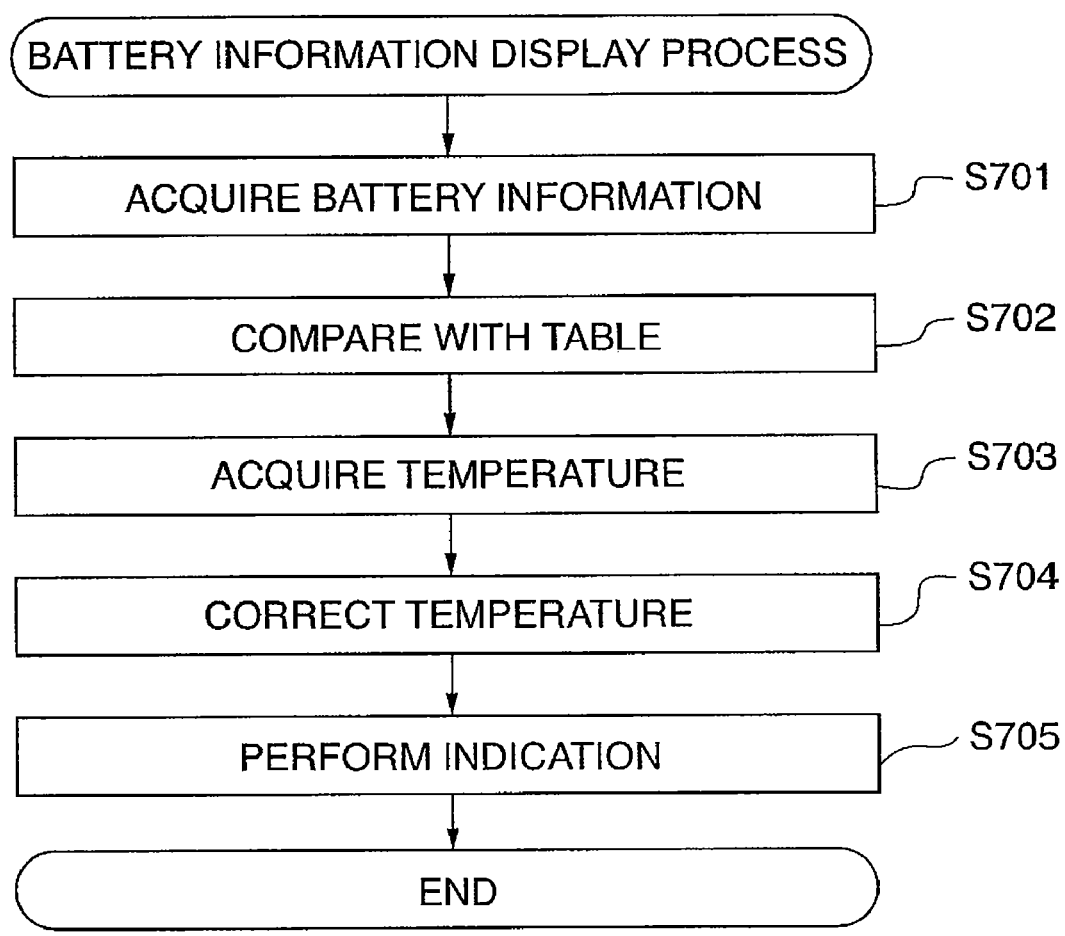
FIG. 7 is a flowchart showing the procedure a battery information display process that is performed by the electronic camera of FIG. 1.

FIG. 7 is a flowchart showing the procedure the battery information display process that is performed by the image processing apparatus shown in FIG. 1.

In FIG. 7, first in the step S701, the system control circuit 50 acquires the battery information stored in the nonvolatile memory 56. At this moment, the nonvolatile memory 56 stores the contents shown in FIG. 14.

In FIG. 14, BATID stores an ID unique to a battery. The BATID ID is made up with information including the model number, the date of manufacture, the manufacturer's serial number, and the manufacturing plant of a battery. Any battery user cannot write any data into the BATID ID.

USERNAME includes the name of the battery given by the user so as to be differentiated from other batteries. DATE includes the time when the battery information is written in the nonvolatile memory 56, and FUEL includes the remaining battery capacity at the moment when the battery information is written.

In the step S702, the battery information table shown in FIG. 14 and the battery information stored in the nonvolatile memory 56 are compared with each other.

Figure 8:
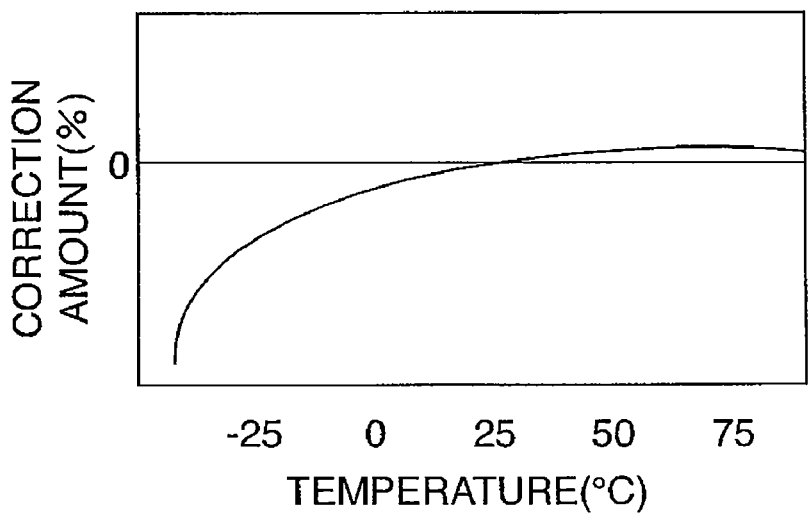
FIG. 8 is a graph showing a correction amount in a temperature correction process on a battery.

In the step S703, the system control circuit 50 acquires the temperature information from the thermometer 44 shown in FIG. 1 (temperature acquisition device). In the step S704, the system control circuit 50 performs temperature correction (remaining battery capacity correction according to temperature) by using the information acquired from the temperature correction table shown in FIG. 8 and the information acquired in the step S703 (correction device).

Figure 10:
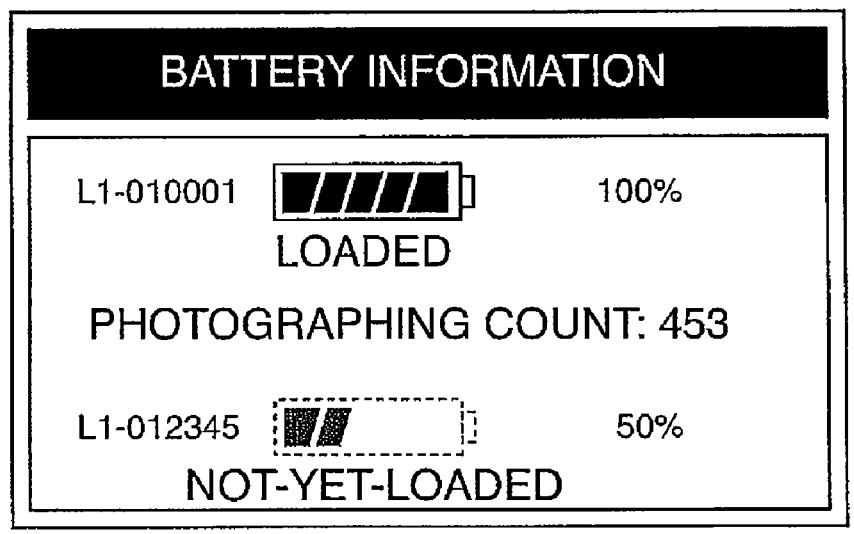
FIG. 10 is a view showing a first example of remaining battery capacity indication on the electronic camera of FIG. 1.
Figure 11:
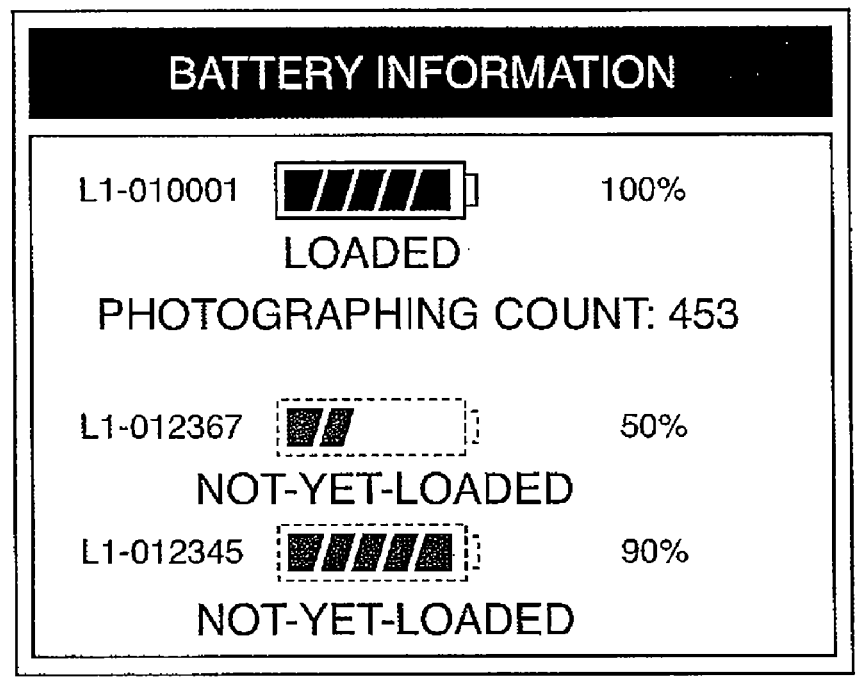
FIG. 11 is a view showing a second example of remaining battery capacity indication on the electronic camera of FIG. 1.

In the step S705, the system control circuit 50 performs the indications shown in FIGS. 10 to 12, followed by terminating the program. FIG. 10 shows a case in which one of the batteries is not yet loaded with its battery information stored. FIG. 11 shows a case in which two of the batteries are not yet loaded with their battery information stored. As it is apparent from FIG. 10 and FIG. 11, information including an ID unique to each battery, a battery icon, a charging rate and whether it is loaded or not-yet-loaded is displayed. The segments of the battery icon are activated according to the charging rate. FIG. 12 shows a case in which the total of the remaining possible-to-photograph image count as powered by the battery loaded in the battery chamber and the remaining possible-to-photograph image count as powered by the battery not yet loaded in the battery chamber is displayed. As it is apparent from FIGS. 10 to 12, the battery which is not currently loaded in the battery chamber is indicated as "not-yet-loaded" with its battery icon displayed in gray. It is also possible to display either the type shown in FIG. 10 and FIG. 11 or the type shown in FIG. 12 according to the user's selection.

A description will be given of a battery cut-off process performed when a battery is removed from the electronic apparatus will be described.

Figure 9:
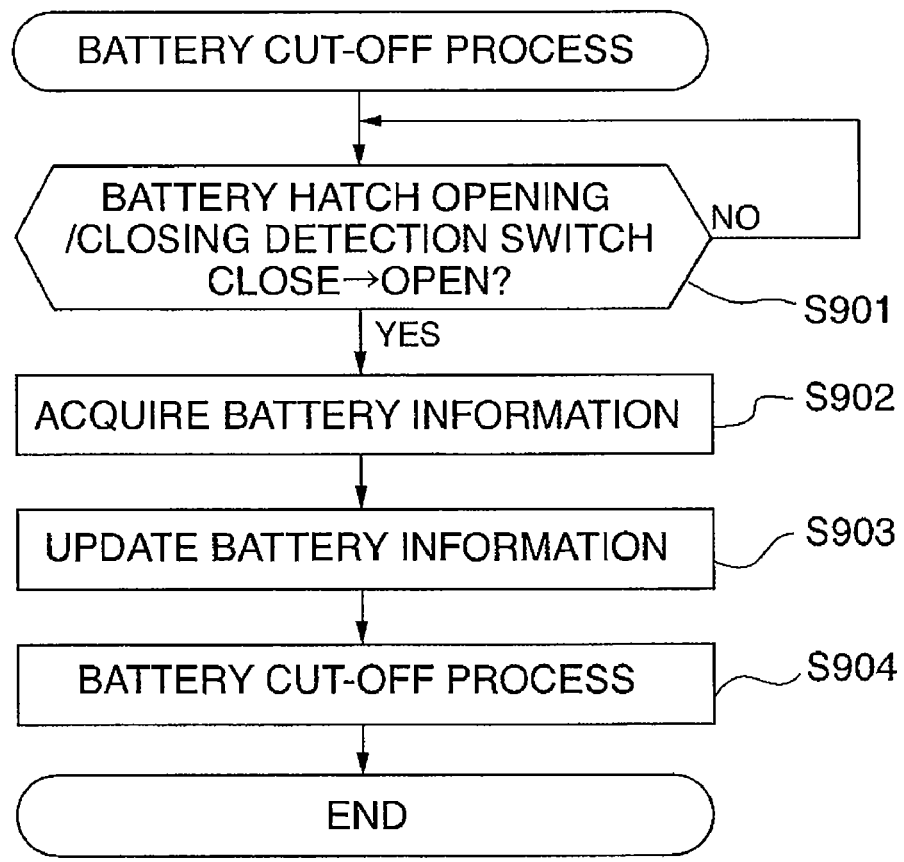
FIG. 9 is a flowchart showing the procedure battery cut-off process that is performed by the electronic camera of FIG. 1.

FIG. 9 is a flowchart showing the procedure battery cut-off process that is performed by the image processing apparatus shown in FIG. 1.

In FIG. 9, the system control circuit 50 first determines whether or not the battery lid opening/closing detection switch 413 has changed from the closed state to the open state (step S901). When the battery lid opening/closing detection switch 413 detects that the battery lid 410 is opened, the battery is still kept in the battery chamber by the battery lock lever 412. This means that a time required for completing the power supply cut-off process is secured between the time when the battery lid opening/closing detection switch 413 changes from the closed state to the open state and the time when the battery is removed.

When the battery lid opening/closing detection switch 413 changes from the closed state to the open state (YES to the S901), the system control circuit 50 acquires the battery information (step S902) (first acquisition device). Then, the system control circuit 50 updates the acquired battery information (step S903) (updating device). Specifically, the system control circuit 50 overwrites the battery information stored in the nonvolatile memory 56. Finally, the system control circuit 50 performs the battery cut-off process (step S904), followed by terminating the program.

In the above embodiments, the photographing operation is performed by moving the mirror 130 between the mirror up and down positions; though, the mirror 130 may be a half mirror, and the photographing operation may be performed without moving the mirror.

Furthermore, the recording media 200 and 210 are not limited to memory cards such as PCMCIA cards, Compact Flash (Registered Trademark) cards, or the like; hard disks and the like. Specifically, the recording media 200 and 210 may be micro DATs; magneto-optical disks; optical disks such as CD-Rs, CD-RWs or the like; phase change optical disks such as DVDs, and the like. Also, the recording media 200 and 210 may be hybrid media that integrate memory cards, hard disks and the like. Moreover, such hybrid media may include detachable media.

In the above embodiments, the recording media 200 and 210 are independent from the image processing apparatus 100 and are arbitrarily connectable. Alternatively, one or both of the recording media 200 and 210 may be permanently connected to the image processing apparatus 100. Further alternatively, one or more number of the recording media 200 and 210 may be connected to the image processing apparatus 100.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-207023 filed Aug. 8, 2007, which is hereby incorporated by reference herein in its entirety.

What is claimed is:

1. An electronic apparatus having a battery chamber that accommodates a battery; comprising:
a first acquisition device adapted to acquire battery information of the battery that is accommodated in the battery chamber, wherein the first acquisition device acquires the battery information in a case where the battery is unloaded from the battery chamber, and the battery information includes a battery ID information;
a second acquisition device adapted to acquire battery information of the battery that is accommodated in the battery chamber, wherein the second acquisition device acquires the battery information in a case where the battery is loaded into the battery chamber, and the battery information includes a battery ID information;
a storing device adapted to store, for each battery ID information, the battery information acquired by each of the first acquisition device and second acquisition device; and
a display device adapted to display the battery information stored in the storing device for each battery ID information, wherein the display device displays the battery information of the battery that is not accommodated in the battery chamber based on the battery information acquired by the first acquisition device.

2. An electronic apparatus according to claim 1, wherein said display device displays the battery information of the battery that is accommodated in said battery chamber and the battery information of a battery that is not accommodated in said battery chamber, in different display forms.

3. A method for controlling an electronic apparatus having a battery chamber that accommodates a battery; comprising:
   a first acquisition step of acquiring battery information of the battery that is accommodated in the battery chamber, wherein the first acquisition step acquires the battery information in a case where the battery is unloaded from the battery chamber, and the battery information includes a battery ID information;
   a second acquisition step of acquiring battery information of the battery that is accommodated in the battery chamber, wherein the second acquisition step acquires the battery information in a case where the battery is loaded into the battery chamber, and the battery information includes a battery ID information;
   a storing step of storing, for each battery ID information, the battery information acquired at each of the first acquisition step and second acquisition step; and
   a display step of displaying the battery information stored at the storing step for each battery ID information, wherein the display step displays the battery information of the battery that is not accommodated in the battery chamber based on the battery information acquired by the first acquisition step.

4. A method for controlling an electronic apparatus according to claim 3, wherein said display step displays the battery information of the battery that is accommodated in the battery chamber and the battery information of a battery that is not accommodated in said battery chamber in different display forms.

* * * * *